United States Patent
Dingl et al.

(10) Patent No.: US 7,654,236 B2
(45) Date of Patent: Feb. 2, 2010

(54) METHOD AND DEVICE FOR CONTROLLING AN INTERNAL COMBUSTION ENGINE

(75) Inventors: Jürgen Dingl, Regensburg (DE);
Gerhard Schopp, Pettendorf (DE);
Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/659,553

(22) PCT Filed: Jul. 7, 2005

(86) PCT No.: PCT/EP2005/053246
§ 371 (c)(1),
(2), (4) Date: Feb. 6, 2007

(87) PCT Pub. No.: WO2006/015919
PCT Pub. Date: Feb. 16, 2006

(65) Prior Publication Data
US 2007/0289564 A1    Dec. 20, 2007

(30) Foreign Application Priority Data
Aug. 6, 2004   (DE) ................. 10 2004 038 338

(51) Int. Cl.
*F01L 1/34* (2006.01)
(52) U.S. Cl. ........... 123/90.17; 123/90.15; 123/90.31
(58) Field of Classification Search ........... 123/90.17, 123/90.15, 90.31, 90.16
See application file for complete search history.

(56) References Cited

U.S. PATENT DOCUMENTS 6,445,989 B2 * 9/2002 Nishimura et al. ........... 701/48
6,502,545 B1 1/2003 Ganser et al.
2003/0127064 A1 7/2003 Nohara et al.
2004/0049334 A1 * 3/2004 Henn ................... 701/104

FOREIGN PATENT DOCUMENTS

| DE | 39 40 752 A1 | 6/1991 |
| DE | 199 60 561 C1 | 1/2001 |
| DE | 100 25 495 A1 | 5/2001 |

(Continued)

OTHER PUBLICATIONS

M. Beer; H. Körkemeier and P. Zickwolf, "Der neue Motor des Porsche 911 Turbo", MTZ Motortechnische Zeitschrift 61, 2000, pp. 730-743, vol. 11.

*Primary Examiner*—Zelalem Eshete
(74) *Attorney, Agent, or Firm*—King & Spalding L.L.P.

(57) ABSTRACT

An internal combustion engine comprises an intake tract in which a throttle valve is disposed. The engine also comprises a camshaft which acts on gas inlet valves associated with respective cylinders. A phase-adjustment device is used to adjust a phase between the camshaft and a crankshaft. A desired air mass flow in a combustion chamber of the cylinder is determined depending on a charge requirement requested by the driver. The desired air mass flow is adjusted by varying the phase between the camshaft and the crankshaft if the desired air mass flow can be adjusted by varying the phase while substantially maintaining an actual pressure difference upstream and downstream of the throttle valve. Otherwise, the desired air mass flow is adjusted by varying the opening angle of the throttle valve.

10 Claims, 4 Drawing Sheets

FOREIGN PATENT DOCUMENTS

| | | |
|---|---|---|
| EP | 1 039 116 A1 | 9/2000 |
| EP | 1 106 807 A2 | 6/2001 |
| EP | 1 229 230 A2 | 8/2002 |
| EP | 1 273 777 A2 | 1/2003 |
| EP | 1 394 367 A1 | 3/2004 |

* cited by examiner

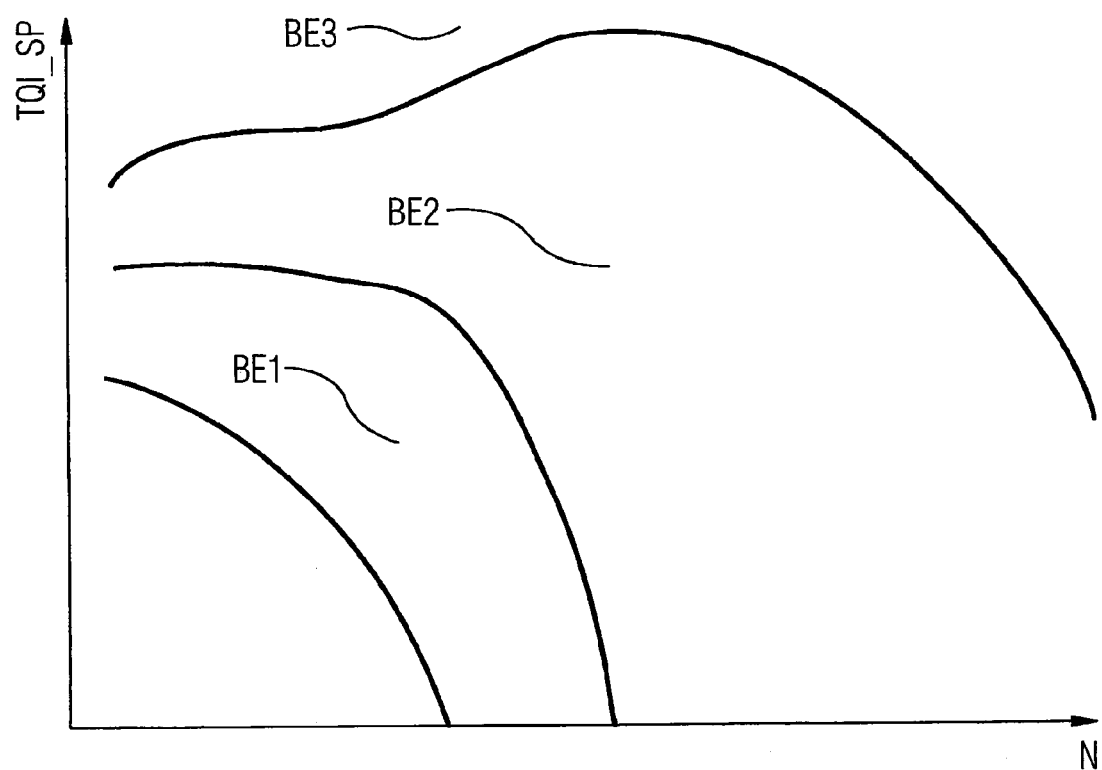

METHOD AND DEVICE FOR CONTROLLING AN INTERNAL COMBUSTION ENGINE

CROSS REFERENCE TO RELATED APPLICATIONS

This application is the U.S. National Stage of International Application No. PCT/EP2005/053246, filed Jul. 7, 2005 and claims the benefit thereof. The International Application claims the benefits of German application No. 10 2004 038 338.3 filed Aug. 6, 2004, both of the applications are incorporated by reference herein in their entirety.

FIELD OF INVENTION

The invention relates to a method and a device for controlling an internal combustion engine.

BACKGROUND OF THE INVENTION

High demands are increasingly being placed on internal combustion engines in terms of their performance and efficiency. At the same time, the emissions also have to be low due to strict legal regulations. Demands of this kind can readily be satisfied if the internal combustion engine is fitted with gas exchange valves and corresponding drives for said valves, in which the valve-lift response differs depending on the operating point of the internal combustion engine. In this way, throttle losses upon intake of air can be reduced and, optionally, high exhaust-gas recirculation rates rapidly adjusted.

Thus, it is known, for example, for the valve lift of a gas inlet valve of the internal combustion engine to be adjusted between a low and a high lift. Furthermore, it is also known for the phase relation between the valve lift of the gas inlet valve and the valve lift of the gas outlet valve to be adjusted. Thus, for example, the Porsche 911 Turbo is fitted with a device for adjusting the phase relation between the valve lift of the gas inlet valve and of the gas outlet valve. Furthermore, the internal combustion engine of this vehicle is fitted with a camshaft on which for each gas inlet valve one cam with a low lift and two further cams with a higher lift are fashioned. The cam displacement is transferred by means of a transfer unit to the gas inlet valve. The transfer unit is fashioned as a cup tappet, which comprises a cylinder element and an annular cylinder element arranged concentrically in relation to said cylinder element. The cam with the low lift acts on the cylinder element while the cams with the higher lift act on the annular cylinder element. Depending on a switching position of the cup tappet, either the low or the high lift is transferred to the gas inlet valve. When the internal combustion engine is idling, the low cam lift is transferred to the gas inlet valve. As a result, reduced frictional losses occur due to the small diameter of the cam used in this operating state and to the cylinder element and to the lower valve lift.

Also, a higher charge movement is achieved. By this means, the emissions of the internal combustion engine can be cut and at the same time fuel consumption kept low. The low valve lift is maintained at low and medium charge. Throttle losses can additionally be reduced by a corresponding phase adjustment between the gas inlet valve and the gas outlet valve and an internal exhaust gas recirculation rate resulting therefrom. Where the charge requirements on the internal combustion engine are high, a switch is made to the higher valve lift.

SUMMARY OF INVENTION

The object of the invention is to create a method and a device for controlling an internal combustion engine which enable a low fuel consumption by the internal combustion engine.

The object is achieved in the features of the independent claims. Advantageous embodiments of the invention are characterized in the subclaims.

The invention is distinguished by a method and a corresponding device for controlling an internal combustion engine comprising an intake tract in which a throttle valve is disposed and also comprising a camshaft which acts on gas inlet valves associated with a cylinder. A phase-adjustment device which can be used to adjust a phase between the camshaft and the crankshaft is associated with the camshaft. The phase between the camshaft and a crankshaft is defined as a phase angle between the camshaft and the crankshaft in relation to respective reference positions on the crankshaft and the camshaft. A desired air mass flow into a combustion chamber of the cylinder is determined depending on a charge requirement requested by the driver. The charge requirement requested by the driver is preferably a torque requested by the driver, but it may also be any other variable representing the request by the driver.

The desired air mass flow is adjusted by varying the phase between the camshaft and the crankshaft if the desired air mass flow can be adjusted by varying the phase while substantially maintaining an actual pressure difference upstream and downstream of the throttle valve. Otherwise, the desired air mass flow is adjusted by varying the opening angle of the throttle valve. To determine the actual pressure difference, a recorded or estimated inlet manifold pressure and a recorded or estimated ambient pressure are simply used.

According to the invention, the request of the driver with regard to the desired air mass flow is thus adjusted by varying the phase between the camshaft and the crankshaft, if the desired air mass flow can be adjusted in this way, and the throttle valve is not used as the main actuator for this purpose, which has the disadvantage that a corresponding throttling by varying the opening angle of the throttle valve leads to throttling losses and consequently to a reduction of the efficiency of the internal combustion engine. In contrast to this, varying the phase between the camshaft and the crankshaft leads only to a change in the proportion of an internally recirculated exhaust-gas mass flow and thus reduces the throttling losses. The range in which the phase between the camshaft and the crankshaft can be varied depends firstly on a manipulating range of the phase-adjustment device and secondly on constraints with regard to the combustion of an air/fuel mixture located in the combustion chamber of the cylinder. Constraints of this kind include a declining ignitability and a falling burning rate depending on the internal exhaust gas recirculation rate.

In an advantageous embodiment of the invention, a setpoint pressure difference upstream and downstream of the throttle valve is preset to a range of values approximating to full charge if, when an actual pressure difference corresponds to the setpoint pressure difference, the desired air mass flow can be adjusted by varying the phase.

If the value range is selected appropriately, it can in this way be ensured that a suitable pressure difference exists which is needed, for example, for an optionally present pressure box, which may be associated with a switching valve in an inlet manifold, to function in the prescribed manner or for a tank ventilation system or for a braking system. On the other hand, appropriate selection of the value range approximating to full charge can keep throttling losses extremely low. Consequently, the pressure difference is then low.

In a further advantageous embodiment of the invention, an adjustment of a valve lift of the gas inlet valve is effected by means of a valve-lift-adjustment device from a lower to a higher lift if the air mass flow which can be adjusted while maintaining the actual valve lift by varying the phase, is less than the desired air mass flow. In this way, a very broad operating range is advantageously produced in which the internal combustion engine can be operated largely throttle-free and yet a charge requirement requested by the driver can be adjusted precisely.

In this connection, it is advantageous if the valve lift of the gas inlet valve is adjusted from a higher to a lower valve lift if the desired air mass flow at the lower valve lift can be adjusted by varying the phase. A particularly high degree of efficiency of the internal combustion engine can be guaranteed in this way.

In this connection, it is particularly advantageous if, when the valve lift of the gas inlet valve is adjusted from the higher to the lower valve lift, the phase is simultaneously varied such that at this valve lift the desired air mass flow flows into the combustion chamber of the cylinder. In this way, a torque-neutral transition from the higher to the lower valve lift can be ensured and ready operation of the internal combustion engine consequently ensured.

BRIEF DESCRIPTION OF THE DRAWINGS

Exemplary embodiments of the invention will be explained below with the aid of the schematic diagrams, in which:

FIG. 4 shows a flow diagram of a program for controlling the internal combustion engine and FIG. 5 shows various operating ranges of the internal combustion engine in relation to the torque generated by it, plotted against the engine speed.

Elements of the same design or function are labeled with the same reference characters in all the figures.

DETAILED DESCRIPTION OF INVENTION

Figure 1:
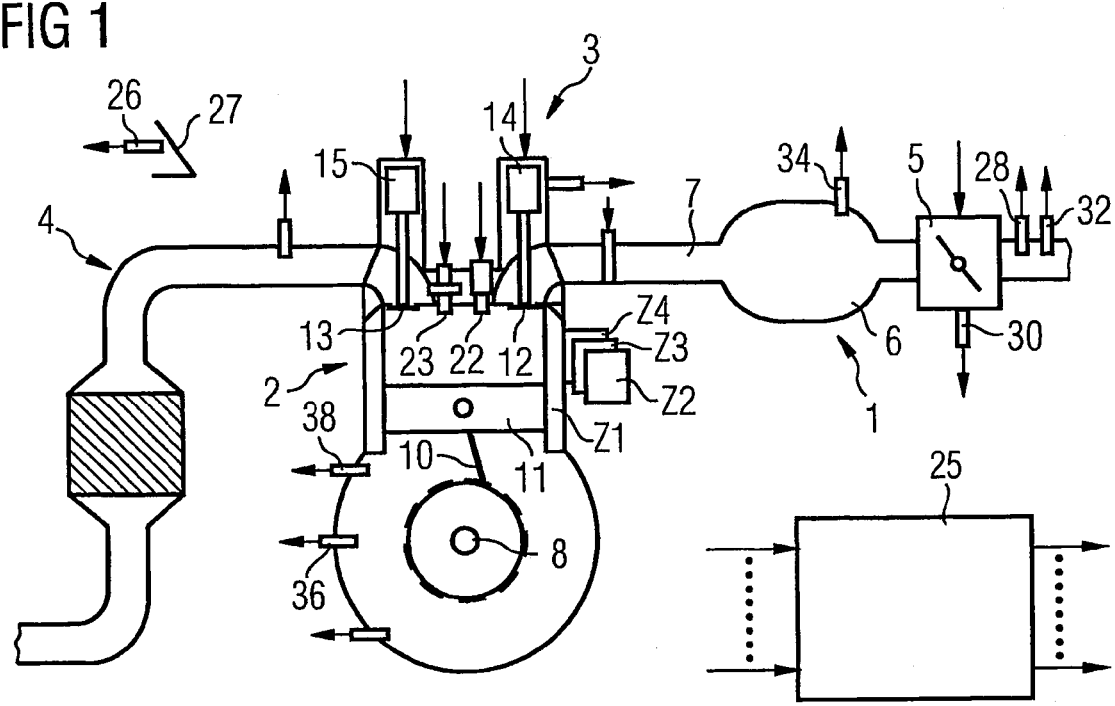
FIG. 1 shows an internal combustion engine comprising a control device.

An internal combustion engine (FIG. 1) comprises an intake tract 1, an engine block 2, a cylinder head 3 and an exhaust tract 4. The intake tract 1 preferably comprises a throttle valve 5, as well as a manifold 6 and an inlet manifold 7 which is routed to a cylinder Z1 via an inlet channel into the engine block. The engine block 2 also comprises a crankshaft 8 which is coupled via a connecting rod 10 to the piston 11 of the cylinder Z1.

The cylinder head 3 comprises a valve drive comprising at least one gas inlet valve 12, at least one gas outlet valve 13 and valve drives 14, 15.

Figure 3:
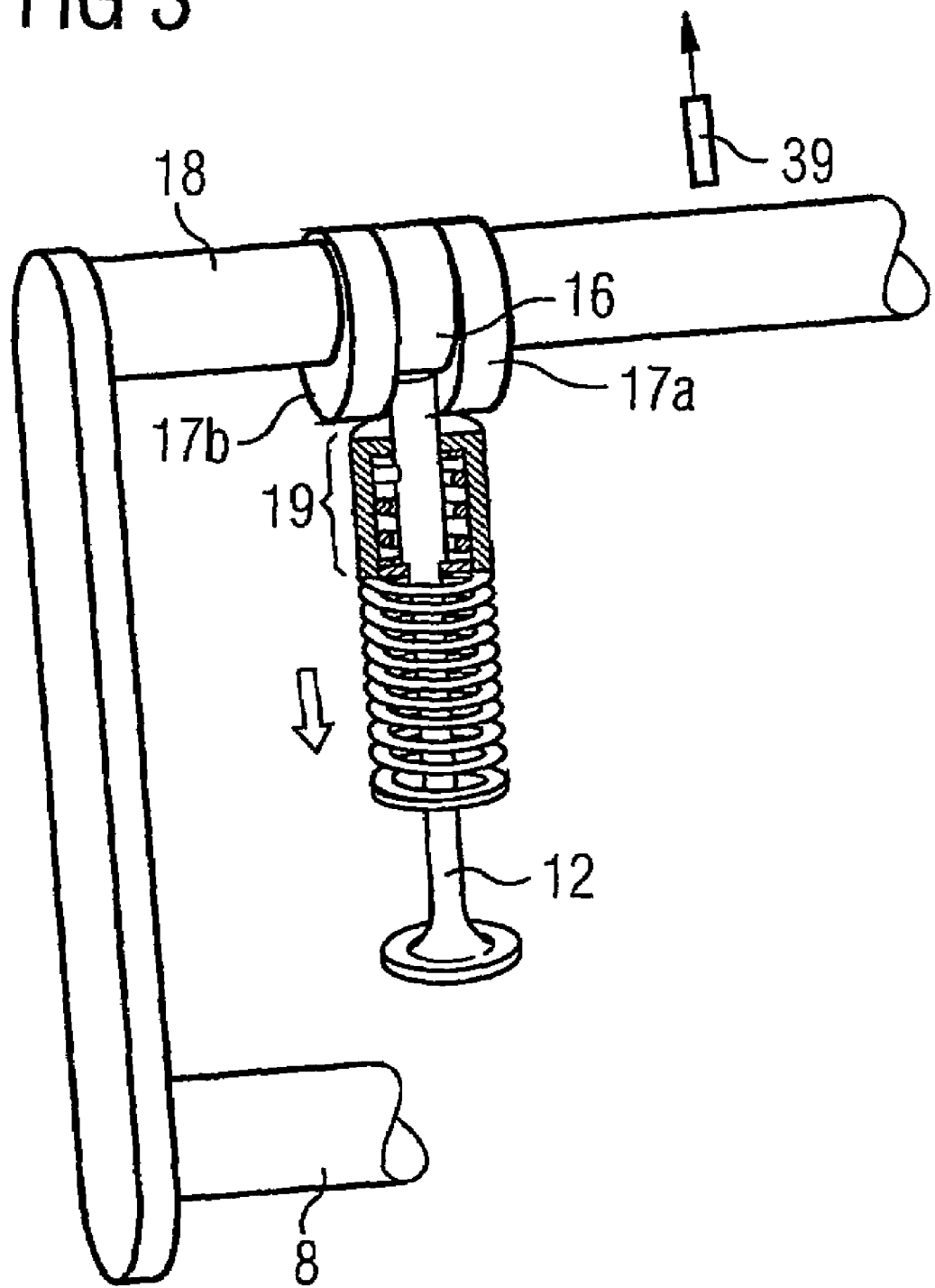
FIG. 3 shows yet a further view of further parts of the internal combustion engine according to FIG. 1.

A camshaft 18 is provided which comprises cams 16, 17a, 17b which act on the gas inlet valve 12. Also provided is a valve-lift-adjustment device 19 (FIG. 3) which is fashioned such that it can be used either to bring the cam 16 with a low valve lift VL to act on a tappet of the gas inlet valve 12 or, in another switched position of the valve-lift-adjustment device 19, to bring the cams 17a, 17b with a high valve lift VL to act on the tappet of the gas inlet valve 12. The valve-lift-adjustment device 19 may, for example, form part of a cup tappet associated with the gas inlet valve 12. It may, however, also be fashioned such that it displaces, for example, the camshaft 18 axially, and in this way the switch can be effected from a higher to a lower valve lift or vice versa.

Figure 2:
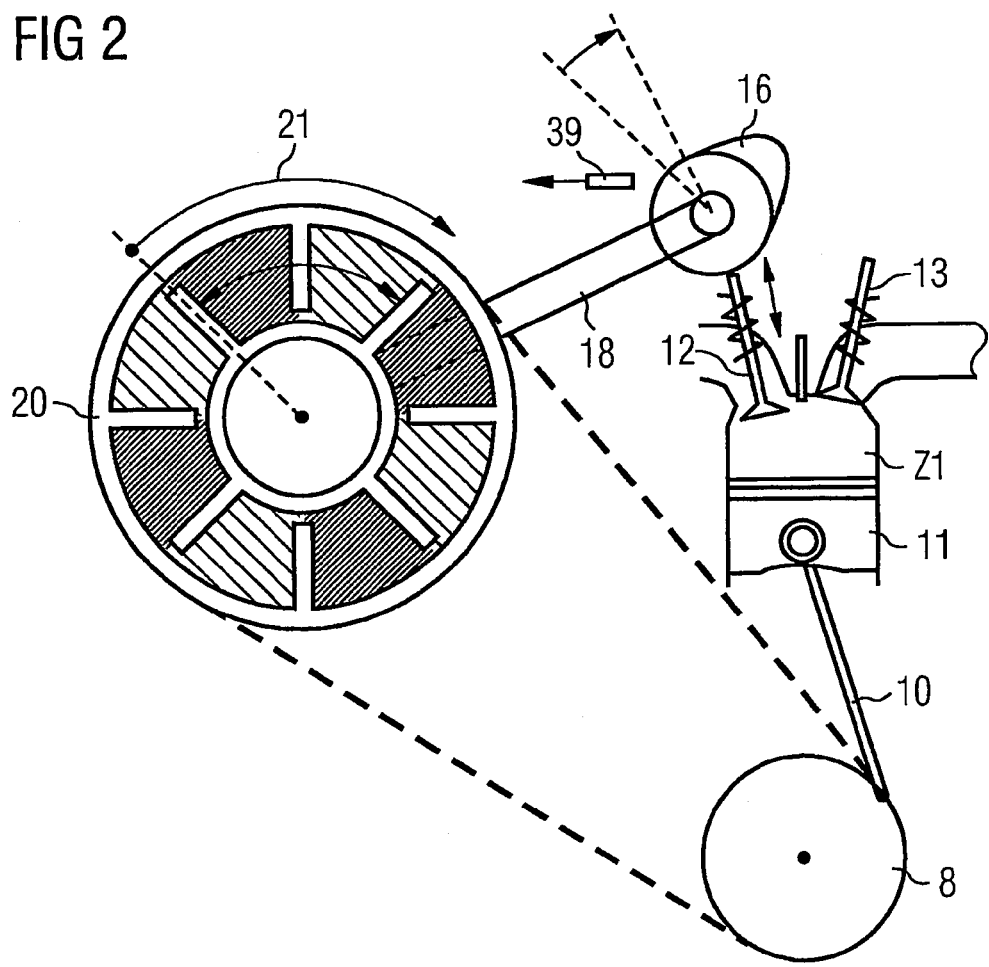
FIG. 2 shows a further view of first parts of the internal combustion engine according to FIG. 1.

Also provided is a phase-adjustment device 20 (FIG. 2) which can be used to adjust a phase between the crankshaft 8 and the camshaft 18. This adjustment of the phase can be effected, for example, by raising a hydraulic pressure in high-pressure chambers of the phase-adjustment device 20 or by lowering the corresponding pressure, depending on the direction in which the phase is to be adjusted. A possible adjustment range of the phase is labeled with an arrow 21.

Preferably, at least two camshafts 18 are provided, one of the camshafts being associated with the respective gas inlet valves 12 and the other camshaft being associated with the respective gas outlet valves 13. In particular, the camshaft which is associated with the gas outlet valves 13 can in a simple embodiment with a fixed phase relative to the crankshaft 8 be coupled to said crankshaft mechanically. It can, however, also be coupled to the crankshaft 8 via a corresponding phase-adjustment device. In this case, the phase of the camshaft which acts on the gas outlet valves 13 can then also be adjusted.

Below, however, details will be given essentially of the camshaft 18 which acts on the gas inlet valves 12 and of the phase-adjustment device 20 associated with said camshaft.

By varying the phase between the crankshaft 8 and the camshaft 18, the valve overlap of the gas inlet valve and of the gas outlet valve 13 can be changed, i.e. the crankshaft angle range over which both an inlet and an outlet of the cylinder Z1 is cleared. The phase-adjustment device 20 and the valve-lift-adjustment device 19 can also be fashioned in any other manner known to the relevant person skilled in then art.

The cylinder head 3 comprises also an injection valve 22 and a spark plug 23. Alternatively, the injection valve 22 can also be disposed in the inlet manifold 7.

A control device 25 is provided with which sensors are associated which record different measurable variables and respectively determine the value of the measurable variable. The control device 25 determines depending on at least one of the measurable variables manipulated variables which are then converted into one or more actuating signals for controlling the final control elements by means of corresponding servo drives. The control device 25 can also be called a device for controlling the internal combustion engine.

The sensors are a pedal position sensor 26 which records an accelerator-pedal position of an accelerator pedal 27, an air mass sensor 28 which records an air mass flow upstream of the throttle valve 5, a throttle valve position sensor 30 which records an opening angle of a throttle valve, a first temperature sensor 32 which records an intake-air temperature, an inlet-manifold pressure sensor 34 which records an inlet-manifold pressure in the manifold 6 and a crankshaft angle sensor 36 which records a crankshaft angle with which an engine speed N is then associated. A second temperature sensor 38 records a coolant temperature. Furthermore, a camshaft angle sensor 39 is provided which records a camshaft angle. Depending on the embodiment of the invention, any subset of the stated sensors may be present or additional sensors may also be present.

The final control elements are, for example, the throttle valve 5, the gas inlet and gas outlet valves 12, 13, the valvelift-adjustment device 19, the phase-adjustment device 20, the injection valve 22 or the spark plug 23.

Besides the cylinder Z1, further cylinders Z2 to Z4 are preferably also provided, with which corresponding final control elements are then also associated.

A program for controlling the internal combustion engine is stored in a program memory of the control device 25 and is executed in the control device while the internal combustion engine is running. The program is started in a step S1 (FIG. 4) in which optionally variables are initialized. The program preferably starts promptly upon startup of the internal combustion engine.

In a step S2, a setpoint inlet-manifold pressure MAP is specified for adjusting the actual inlet manifold pressure such that the actual inlet manifold pressure which has been adjusted in this way lies in a specified value range in which the inlet-manifold pressure is suitably high in comparison with the ambient pressure so as to keep throttle losses as low as possible, but is on the other hand also so low that the low air pressure needed for components of the internal combustion engine can be made available. Such components can, for example, be a pressure box of a switching valve. Such switching valves are frequently disposed in inlet manifolds of the internal combustion engine. Furthermore, a corresponding low pressure may also be of significance for a tank ventilation system. For example, the setpoint inlet-manifold pressure MAP should be predetermined such that the correspondingly adjusted actual inlet-manifold pressure lies in a relatively narrow range of pressure around a pressure reduced by about 50 hectopascals compared to the ambient pressure. The ambient pressure can be recorded by an ambient-pressure sensor provided specifically for that purpose. It can, however, also be derived from the measured signal of the inlet-manifold pressure sensor, if the inlet manifold is largely throttle-free.

In a step S8, a phase PH to be adjusted between the crankshaft 8 and the camshaft 18 is determined depending on the setpoint inlet-manifold pressure MAP, the desired air mass flow MAF into cylinder Z1 to Z4, the engine speed N, the valve lift VL, the opening angle THR of the throttle valve 5 and optionally further measurable variables or variables derived therefrom. To this end, corresponding characteristics are preferably stored in a data memory of the control device 25 and/or a corresponding physical model of the absorption behavior of the internal combustion engine filed in the control device 25. A model of this type comprises, for example, a section-wise linear correlation between the phase PH and the setpoint inlet-manifold pressure MAP. The parameters necessary for the section-wise linear correlation between the phase PH and the setpoint inlet-manifold pressure MAP, of a gradient and an offset, are preferably determined from characteristics dependent on the other variables. The characteristics are determined in advance, for example, through tests on an engine test bed or though simulation. Determination of the phase PH between the crankshaft 8 and the camshaft 18 in step S8 is carried out with the objective of substantially adjusting the desired air mass flow MAF by varying the phase PH.

In a step S10, it is then checked whether the phase determined in step S8 is greater than a maximum value PH_MAX. The maximum value PH_MAX is the particular value at which, taking into account the constraints relevant to the process of combustion of the air/fuel mixture such as, for example, an adequate ignitability and adequate burning rate of the air/fuel mixture, stable running of the engine is reliably enabled.

The maximum value PH_MAX can in a particularly simple embodiment be fixed, but it can also depend on at least one measurable variable or a variable derived therefrom.

If in step S10 the phase PH is greater than the maximum value PH_MAX, then in a step S12 a check is carried out as to whether a switch to a higher valve lift VL is possible. Whether this is possible depends on the actual valve lift VL and the design of the valve-lift-adjustment device 19 and the respective cams 16, 17a. In a particularly simple embodiment, absolutely no adjustment of the valve lift may also be possible, alternatively a switch can be made between a high and a low valve lift or else a switch between multiple stages from the lowest and up to the highest valve lift.

If the condition of step S12 is not fulfilled, then an adjustment is made to a desired air mass flow MAF which is derived from a charge requirement requested by a driver essentially by means of a corresponding varying of the throttle valve opening angle THR and thus a changing of the actual inlet manifold pressure. The throttle valve opening angle THR is determined in a step S13 depending on the desired air mass flow MAF, the engine speed N and, taking into account the valve lift VL of the gas inlet valve 12 and the phase PH between the crankshaft 8 and the camshaft 18, optionally further measurable variables or variables derived therefrom.

Following on from step S13, a corresponding actuation of the throttle valve 5 is then carried out in order to adjust the desired air mass flow. A corresponding adjustment of the valve lift and/or the phase between the camshaft 18 and the crankshaft 8 is optionally carried out, depending on the steps which have been executed since the last calculation run of the program. Critically, however, the adjustment of the desired air mass flow MAF is carried out in step S13 by means of a corresponding varying of the opening angle THR of the throttle valve 5. In support, however, the phase may also be varied.

Following on from step S13, the program waits in a step S6 for a predetermined waiting period T_W during which other programs can be executed in the control device. The predetermined waiting period T_W is suitably chosen such that throughout operation of the internal combustion engine the desired air mass flow MAF can be adjusted sufficiently precisely. Alternatively, the program can in step S6 also wait for a predetermined crankshaft angle range Following on from step S6, processing is continued afresh in step S2.

If on the other hand the condition of step S12 is not fulfilled, then the valve lift VL is computationally increased in a step S14 and the phase PH is then recalculated in a step S8, taking into account the new valve lift VL.

If, on the other hand, in step S10 the phase is less than or equal to the maximum value PH_MAX, then the valve lift VL is computationally reduced in a step S16 insofar as this is possible based on the design of the cams 16, 17a, 17b and on the valve-lift-adjustment device 19. Consequently, in steps S14, S16, actual readjustment of the valve lift VL does not occur, rather said valve lift serves merely as an operand for determining the further manipulated variables in the following steps.

In a step S18, the phase PH is then redetermined in accordance with the procedure used in step S8, taking the valve lift VL determined in step S16 as a basis.

In a step S20, a check is then made as to whether the phase PH is greater than the maximum value PH_MAX. If this is the case, then in a step S22, the valve lift VL has to be increased again and in a step S24, the phase PH determined in step S8 actually adjusted. In step S24, actual adjustment of the valve lift VL optionally additionally also occurs, depending on which steps have previously been executed.

If, on the other hand, the condition of step S20 is not fulfilled, then in a step S26, a check is made as to whether the phase PH is less than a minimum value PH_MIN, which, also subject to constraints critical to combustion, is specified for respective minimal filling with air at the current valve lift VL. If the condition of step S26 is not fulfilled, then in a step S24, the phase determined in step S18 is adjusted and if the valve lift VL determined has also changed since the last calculation run of the program, said valve lift is also adjusted. Following on from the processing of step S24, processing is continued in step S6.

If, on the other hand, the condition of step S26 is not fulfilled, then a check is made in step S28 as to whether the valve lift VL can be further reduced. If this is the case, then in a step S30, the valve lift VL is computationally reduced. Following on from step S30, the processing is then continued in step S18 in which the phase PH is recalculated, taking into account the valve lift VL determined in step S30. If, on the other hand, the condition of step S28 is not fulfilled, then processing is continued in step S13 and consequently adjustment of the desired air mass flow MAF is then critically carried out by correspondingly varying the opening angle THR of the throttle valve.

Figure 4:
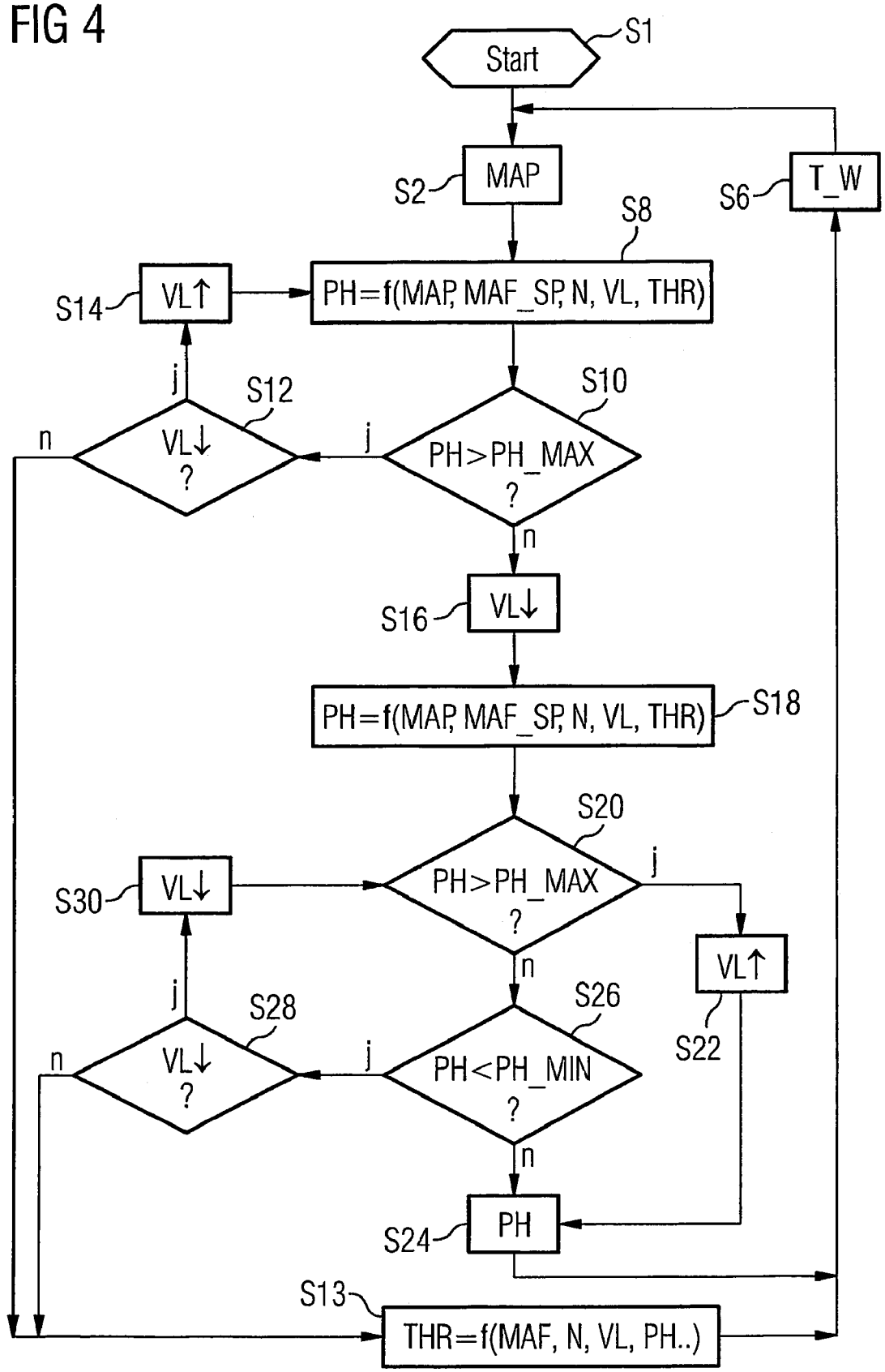

FIG. 4 [shows] various operating ranges of the internal combustion engine depending on a torque TQI_SP requested by the driver which is preferably an air-path torque and consequently the particular torque which can be adjusted by correspondingly varying final control elements which [ ] the air supply to the respective cylinder Z1 to Z4. Furthermore, the dependence of the engine speed N is also represented. In a range BE1, a low valve lift VL is adjusted and the adjustment of the desired air mass flow MAF is made by corresponding varying of the opening angle THR of the throttle valve. In a range BE2, the low valve lift VL continues to be adjusted and the adjustment of the desired air mass flow MAF is made by correspondingly varying the phase PH. In a third range BE3, a high valve lift VL is adjusted and the adjustment of the desired air mass flow MAF is made by correspondingly varying the phase PH. In the range of the transition from the second to the third range BE2, BE3, a throttling may optionally be required as in the first range BE1.

The invention claimed is:

1. A method for controlling an internal combustion engine having an intake tract with a throttle valve, a camshaft that acts on a plurality of gas inlet valves associated with a cylinder, and a phase-adjustment device associated with the camshaft that adjusts a phase between the camshaft and a crankshaft, comprising:
   determining an ambient pressure upstream of the throttle valve;
   recording a measured inlet manifold pressure downstream of the throttle valve;
   determining a desired air mass flow into a combustion chamber of the cylinder based on a charge requirement requested by a driver;
   determining whether the phase between the camshaft and the crankshaft can be varied while maintaining an actual pressure difference upstream and downstream of the throttle valve;
   adjusting the desired air mass flow by varying the phase between the camshaft and the crankshaft if it is determined that the phase between the camshaft and the crankshaft can be varied while maintaining an actual pressure difference upstream and downstream of the throttle valve; and
   otherwise adjusting the desired air mass flow by varying the opening angle of the throttle valve if it is determined that the phase between the camshaft and the crankshaft cannot be varied while maintaining an actual pressure difference upstream and downstream of the throttle valve.

2. The method as claimed in claim 1, wherein a setpoint pressure difference upstream and downstream of the throttle valve is preset to a value range approximating a full charge and is adjusted if an actual pressure difference matches the setpoint pressure difference, the desired air mass flow is adjusted by varying the phase.

3. The method as claimed in claim 2, wherein an adjustment of the valve lift of the gas inlet valve is effected by a valve-lift-adjustment device from a lower to a higher valve lift if the air mass flow, that is adjustable while maintaining the actual valve lift by varying the phase, is less than the desired air mass flow.

4. The method as claimed in claim 3, wherein an adjustment of the valve lift of the gas inlet valve from a higher to a lower valve lift is effected if the desired air mass flow is adjustable at the lower valve lift by varying the phase.

5. The method as claimed in claim 4, wherein an adjustment of the valve lift of the gas inlet valve from a higher to a lower valve lift is effected and at the same time the phase is varied such that at the lower valve lift the desired air mass flow flows into the combustion chamber of the cylinder.

6. A device for controlling an internal combustion engine, comprising:
   an engine block having a crank shaft rotably mounted and a cylinder arranged opposite the crank shaft;
   a cylinder head arranged on the block to form a combustion chamber within the cylinder;
   a camshaft arranged in the cylinder head that acts on gas inlet valves associated with the cylinder;
   means for determining an ambient pressure upstream of the throttle valve;
   an inlet manifold pressure sensor arranged downstream of a throttle valve that records a measured inlet manifold pressure downstream of the throttle valve;
   a phase-adjustment device operatively connected between the camshaft and the crank shaft that adjusts a phase relationship between the camshaft and the crankshaft;
   a desired air mass flow determining device that determines a desired air mass flow into a combustion chamber of the cylinder depending on a charge requirement requested by a driver; and
   an adjusting device that:
      determines whether the phase between the camshaft and the crankshaft can be varied while maintaining an actual pressure difference upstream and downstream of the throttle valve;
      adjusts the desired air mass flow by varying the phase between the camshaft and the crankshaft if it is determined that the phase between the camshaft and the crankshaft can be varied while maintaining an actual pressure difference upstream and downstream of the throttle valve; and
      otherwise adjusts the desired air mass flow by varying the opening angle of the throttle valve.

7. The device as claimed in claim 6, wherein a setpoint pressure difference upstream and downstream of the throttle valve is preset to a value range approximating a full charge and is adjusted if an actual pressure difference matches the setpoint pressure difference, the desired air mass flow is adjusted by varying the phase.

8. The device as claimed in claim 7, wherein an adjustment of the valve lift of the gas inlet valve is effected by a valve-lift-adjustment device from a lower to a higher valve lift if the air mass flow, that is adjustable while maintaining the actual valve lift by varying the phase, is less than the desired air mass flow.

9. The device as claimed in claim 8, wherein an adjustment of the valve lift of the gas inlet valve from a higher to a lower valve lift is effected if the desired air mass flow is adjustable at the lower valve lift by varying the phase.

10. The device as claimed in claim 9, wherein an adjustment of the valve lift of the gas inlet valve from a higher to a lower valve lift is effected and at the same time the phase is varied such that at the lower valve lift the desired air mass flow flows into the combustion chamber of the cylinder.

* * * * *